APPARATUS FOR MARKING A CONTROL RECORD

Filed July 22, 1949 3 Sheets-Sheet 1

Inventor
Charles D. Bennes
by Roberts, Cushman & Grover
Att'ys

Nov. 18, 1952 C. D. BENNES 2,618,338

APPARATUS FOR MARKING A CONTROL RECORD

Filed July 22, 1949 3 Sheets-Sheet 2

Inventor
Charles D. Bennes
by Roberts, Cushman & Grover
Att'ys

Nov. 18, 1952 C. D. BENNES 2,618,338

APPARATUS FOR MARKING A CONTROL RECORD

Filed July 22, 1949 3 Sheets-Sheet 3

Inventor
Charles D. Bennes
by Roberts Cushman & Grover
Att'ys

Patented Nov. 18, 1952 2,618,338

UNITED STATES PATENT OFFICE 2,618,338

APPARATUS FOR MARKING A CONTROL RECORD

Charles D. Bennes, Los Angeles, Calif., assignor to Technicolor Motion Picture Corporation, Hollywood, Calif., a corporation of Maine Application July 22, 1949, Serial No. 106,244

4 Claims. (Cl. 164—113)

This invention relates to apparatus for codifying data and marking the encoded data on a record used to control various mechanisms.

In the art of record controlled machines it is common to use a card perforated in certain columns or fields with data-designating holes. A card so punched may be sensed by analyzing apparatus which controls other mechanisms according to the data represented by the perforations. It is also possible to analyze a record marked with opaque spots, light-reflecting spots, electrically conducting elements, or other data designating signals. In certain cases each signal on the record is designed to represent a particular item of data. However, in other instances it is desirable to group the signals in coded combination, each combination representing a statistical or physical value. For example, the application of L. E. Clark, Serial No. 74,727, filed February 5, 1949, describes a control card which has a series of coded groups of perforations for use to control the printing exposure of each scene on a reel of motion picture film. The series of groups corresponds to the series of scenes on the reel of film, the card being fed through an analyzing machine at the same time as the film is fed through a motion picture printer. Each coded group contains up to six perforations arranged in a distinct combination which defines the proper value of light intensity for exposing the corresponding scene on the film. By suitable coordination with the printer the analyzer senses each of the coded groups successively and indicates the proper exposure intensity for the corresponding scene as that scene is fed to the printer. Since the usual reel of film contains a large number of scenes it is desirable to divide a standard control card into two or more columns thereby increasing the number of code groups which may be perforated in the card. At the same time each column must contain space for a number of perforations which may yield a large number of distinct combinations, each combination representing a light value. Such a multicolumn record of coded data is also useful for controlling various other mechanisms such as calculating machines, accounting machines and other industrial apparatus.

Previous perforating machines have been provided with a key for punching each hole of a group. With such a machine it is necessary for the operator to encode each of the light values or other items in a series of data and then punch individually keys corresponding to the individual signals of a code group. This method of encoding the light values is lengthy and so subject to inaccuracy that the completed record must be checked by a procedure as time consuming as the punching operation. Furthermore, if as previously mentioned, it is desirable to punch the groups in two or more columns, the burden of selecting the columns to be punched is added to the difficulty of selecting and punching keys in a coded combination.

Objects of the present invention are to provide a way of encoding a series of values and marking them on a control record which is simple and accurate, and which may be carried out in conjunction with standard accounting equipment. Another object is to provide apparatus for marking a multicolumn record which is rapid and automatic in operation and simple and efficient in use.

In one aspect the invention relates to apparatus for actuating different groups of devices, such as electrically operated record marking devices, and comprises selectors for rendering certain of the devices potentially operative such as a plurality of circuits for transmitting current to the devices respectively in combination with a plurality of switches for closing the circuits in different groups so that by operation of a switch a distinct combination of devices is selected and, where devices for marking a record are employed, a record is marked with a distinct combination of signals. If it is desired to adapt the apparatus to marking two or a greater number of columns of coded signal groups on the record, the apparatus is provided with a like number of sets of punching devices and switching means for selectively interconnecting the aforesaid circuits with any one of the sets of devices so that a particular column may be selected for marking a group therein. In a further aspect the apparatus includes stepping mechanism for advancing the record to successive positions along a path, the marking devices being disposed adjacent said path, and control or sequencing means are provided for operating the stepping means intermittently and the switch means concomitantly therewith, so that the record may be marked with a succession of code groups which progresses back and forth between the columns. In marking a two-column type card, preferably the stepping means is operated every other time that the switching means is operated. However, the switching means and the stepping means may be operated alternately. In the case of a card having a greater number of columns the stepping means may be operated once for each of said number of operations of the switching means.

In a further aspect a timing device is provided which supplies current to the aforesaid switches and the control or sequencing means at different times so that the recording devices will not be operated simultaneously with the record advancing means or the switching means. Desirably the timing device is operable from the starting condition to successive conditions, a first condition in which it supplies current to the aforesaid switches and circuits, a second in which it transfers the contact of a switch to actuate the sequencing switch and a third condition in which it operates a switch which restores the device to starting condition, and a starting switch is provided to start the timing device upon its automatic sequence of operation. A single controller, such as a start key may be provided to initiate the cycle of the timing device.

For the purpose of illustration a typical embodiment of the invention is illustrated in the accompanying drawings in which.

The embodiment of the invention illustrated is designed to punch a control card 31 with a succession of coded groups of up to six perforations, each group comprising a distinct combination of perforations which represents a particular value of printing exposure. The groups are disposed in rows extending transversely of the card, each group being located in one of two columns on the card as shown in Fig. 3. For this purpose the apparatus includes twelve card punches 9 (Fig. 2) disposed above the card in a row extending transversely thereof. The punches are divided into two sets of six punches each. Coding keys 11 (Figs. 1 and 4), each representing a light exposure value, are provided for actuating the punches in different combinations. Each key actuates a combination of up to six punches of either set causing the card to be punched in one of its columns with a coded group of perforations corresponding to the light value represented by the key. A column-selecting relay K6 (Fig. 7) alternately interconnects the coding keys 11 with each of the sets of punches, thus determining the column on the card 31 in which the group of perforations is to be punched. The operation of the punches 9 and the column selecting relay K6 is coordinated with card feeding mechanism 7 for intermittently advancing the card 31 one row at a time under the punches 9, so that the card is perforated with a succession of code groups which progresses back and forth between the columns.

Figure 1:
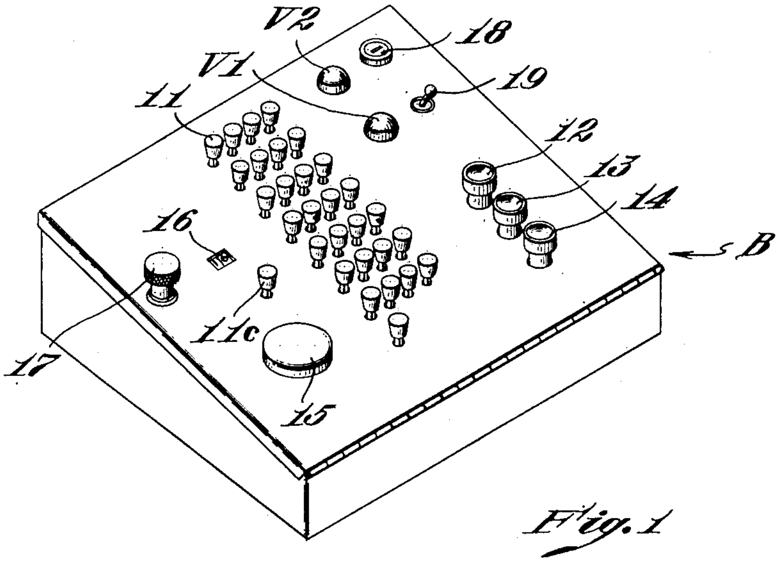
Fig. 1 is an isometric view of a control keyboard.
Figures 2, 3:
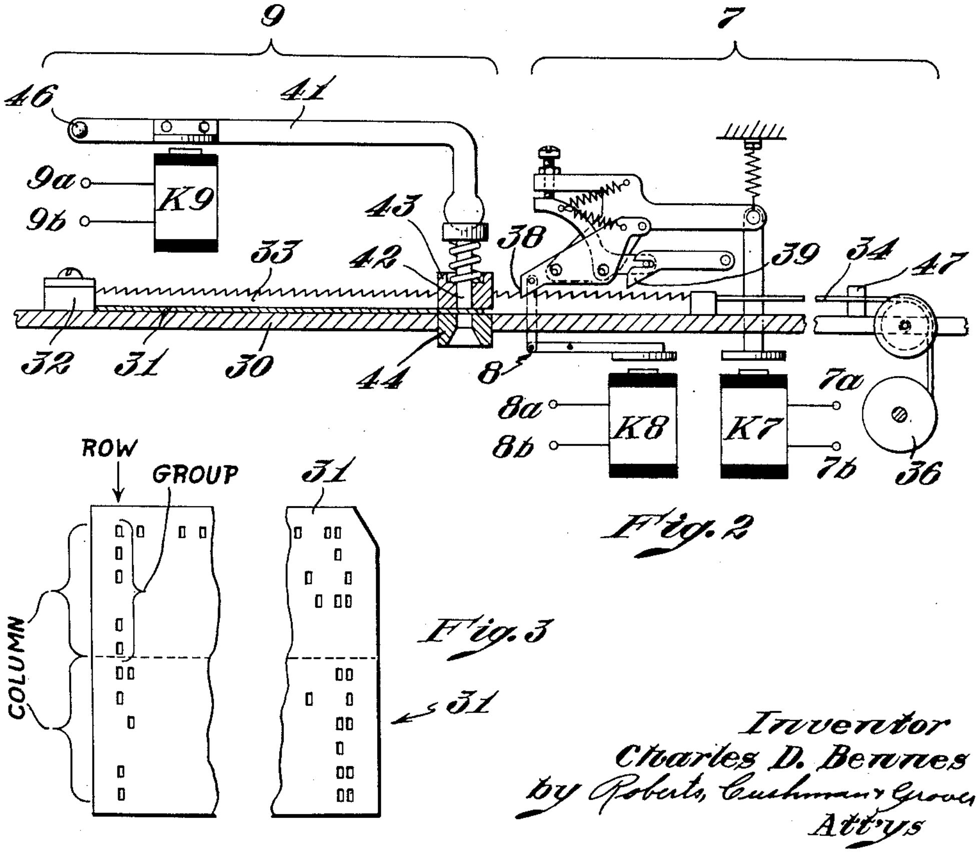
Fig. 2 is an elevation of card feeding and punching mechanism, parts being shown in section or omitted.
Fig. 3 is a plan view of a typical control card.

Fig. 1 shows a control board B on which are mounted the coding keys or switches 11 and keys 12 to 15 for controlling the operation of the card punching and feeding mechanism. The numbered dials of a counter 2 (Fig. 7) appear at a window 16 in the board and an adjusting knob 17 is provided for setting the counter at zero. A fuse 18, a power switch 19 and indicator lamps V1 and V2 are also located on the board.

Perforating mechanism for punching the control card 31 (Fig. 3) is shown in Fig. 2 and includes a bed 30 on which slides card 31. A traveling block 32 is attached to a rack 33, the rack being urged along the side of the bed by a ribbon 34 which is wound on a spring tensioned reel 36. Movement of the rack is controlled by the escapement mechanism indicated generally at 7. The escapement mechanism includes a first pawl 38 normally engaging a tooth of the rack 33, and a second pawl 39 normally raised above the teeth of the rack. By action of a solenoid K7, in response to a momentary current applied at its terminals 7a and 7b, pawl 39 is lowered into engagement with a tooth. As pawl 39 engages a tooth, pawl 38 is disengaged and lifted clear of the teeth. When solenoid K7 is de-energized, pawl 39 is disengaged from the rack and pawl 38 engages an adjacent tooth allowing the rack to move one step. The control card 31 urged by the block 32 advances along the bed to the right from a starting position as shown in Fig. 2, to successive positions under the punching mechanism shown generally at 9.

The punch mechanism includes twelve punching devices each of which comprises a punch solenoid K9 or K9', an arm 41 pivotally mounted at 46, a pin 42 which slides in a guide collar 43, and a die 44 in the bed 30. The punch solenoids may be disposed in any convenient location and the arms 41 formed so that the twelve punches 42 may be arranged in a row extending transversely of and above the card 31. When actuating current is applied at the terminals 9a and 9b of a punch solenoid, the arm 41 is swung on its pivot 46 driving the pin 42 through the card 31 and the die 44. As previously explained the twelve punching devices are divided into two sets, one set for punching a group of up to six perforations in the upper column of card 31 (Fig. 3) and the other set for punching a group in the lower column.

The card 31 is fed stepwise under the row of punches 42 until the desired number of code groups are punched thereon. The card may then be fed clear of the die punch assembly by actuation of ejecting mechanism 8 controlled by the solenoid K8. Current applied at the terminals 8a and 8b of solenoid K8 energizes the solenoid causing it to actuate the linkage 8 thereby lifting the pawl 38 (the pawl being held from engagement with the rack 33 by means of a pin not shown) without dropping the pawl 39 so that the rack and associated card feeding mechanism is free to move to the limits of the rack stop 47. In this position the card may be easily removed from the punch apparatus.

Figures 4, 5, 6:
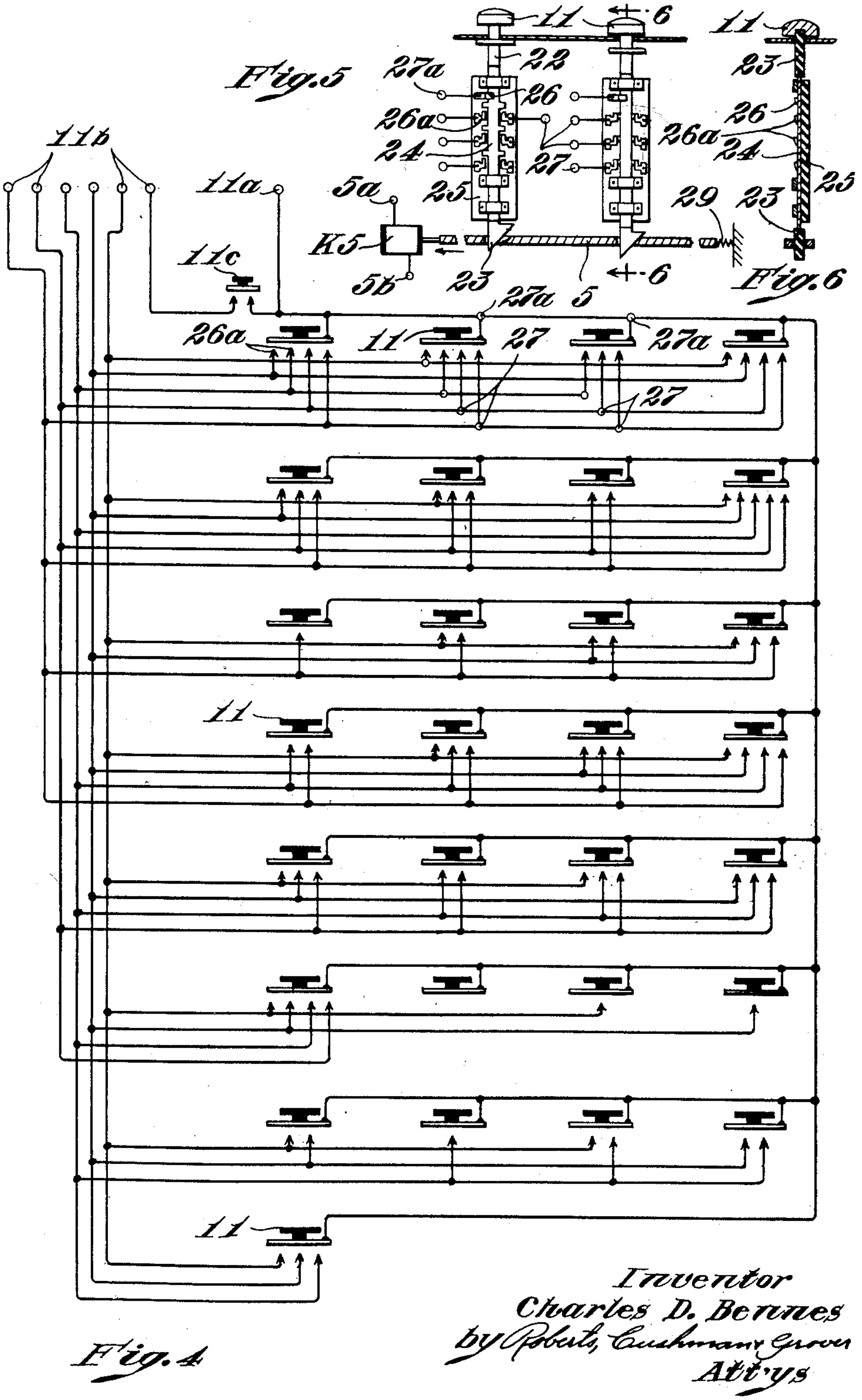
Fig. 4 is a wiring diagram of a coding circuit.
Fig. 5 is a side elevation of the keys shown diagrammatically in Fig. 4.
Fig. 6 is a section on line 6—6 of Fig. 5.
Figure 7:
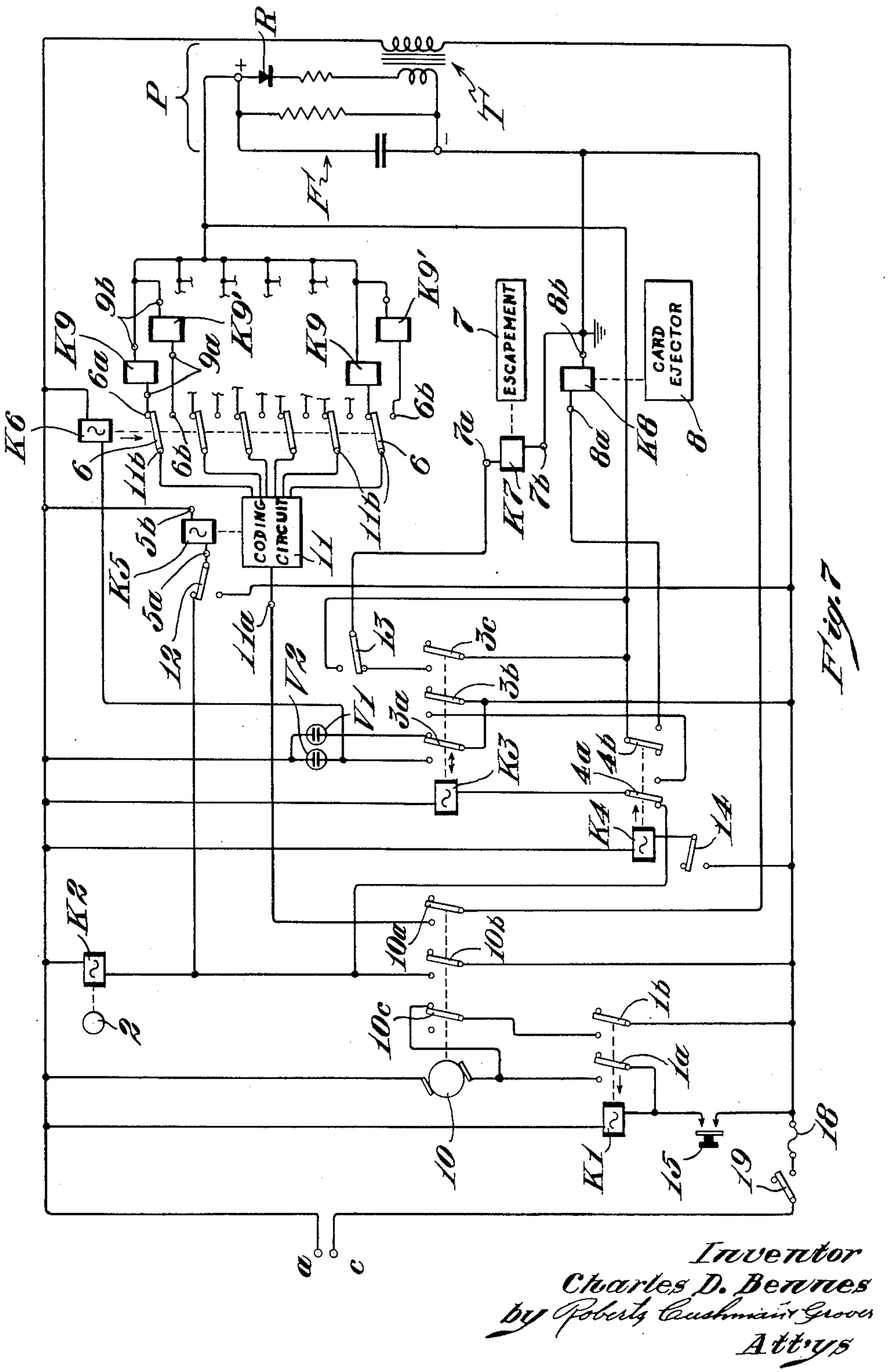
Fig. 7 is a schematic diagram of the electrical circuits of the card feeding and punching mechanism.

The coding circuit associated with the coding keys 11 and shown in Fig. 4 includes a power terminal 11a and coding terminals 11b as shown in Fig. 7. The coding terminals 11b may be interconnected with one of the two sets of six-punch solenoids K9 or K9' as determined by the column-selecting relay K6. The coding keys have a terminal 27a connected to the power terminal 11a and up to five terminals 27 connected to the coding terminals in different combinations, each of which defines the code relation between a particular light value and the corresponding group of perforations. Thus, the terminals 27 of the second in the top row of keys 11 (Fig. 4) are connected respectively to the first three and the fifth coding terminal 11b, while the terminals 27 of the adjacent key are connected to the first three terminals only. Depression of a coding key 11 causes the key terminals 26a to interconnect the power terminal 11a with the coding terminals 11b. A coding key 11c connected only to the sixth coding terminal 11b represents a fractional value such that depression of key 11c with any one of the keys 11 encodes a value which is the sum of the values represented by the two keys depressed. After a key is depressed direct current is supplied from the power supply P through the power terminal 11a, a coding key and the coding terminals 11b selected by the key to those punch solenoids of a set K9 or K9' interconnected with the selected coding terminals, thus causing the solenoids to punch a group of perforations in a coded combination determined by the coding switch.

The structure of the coding keys shown in Figs. 5 and 6 includes, an electrically conducting plunger 24, connected at its end to insulating portions 22 and 23, and frictionally held in a raised or depressed position on an insulating strip 25. Key terminal 27a is connected to the plunger through contact 26. When the key is depressed, springs 26a which are connected to the key terminals 27, make contact with the plunger. The plunger may be returned to raised position by the key raising mechanism which includes a solenoid K5, having terminals 5a and 5b and a camming member 5. When current is applied at terminals 5a and 5b the camming member, normally held to the right by spring 29, is urged to the left as indicated by the arrow, bearing on the cam surface of insulating portion 23, thus camming the plunger upward.

The electrical control circuit associated with the coding circuit of Fig. 4 and the card punching and feeding mechanism of Fig. 2 is shown schematically in Fig. 7. The control circuit includes a controller comprising a starting key 15 and a start-stop relay K1, a timing motor 10, the aforesaid counting device 2 actuated by solenoid K2, a control or sequencing relay K3, the aforesaid counting device 2 actuated by selecting relay K6. Since relays K7—K9 of the card punching and feeding mechanism are, for economy of space, preferably direct current relays, a power supply P is employed to convert alternating current supplied at terminals a and c to direct current. This conventional rectifier includes a transformer T, a rectifying cell R, a filter network F, and positive and negative terminals (+) and (−).

When the starting key 15 is closed, relay K1 is energized, causing switches 1a and 1b to transfer in the direction indicated by the arrow. After the key is released, current is supplied to the relay K1 through switches 1b, 10c and 1a. Current is also supplied through switches 1b and 10c to a timing motor 10 which transfers the contacts of switches 10a—10c in succession at predetermined intervals. At the beginning of the timing cycle, switch 10a is closed, supplying current from the negative terminal (−) of the power supply P through terminals 11a and 11b of the keys 11 to selected punch solenoids K9 causing the latter to punch a coded group of perforations in the control card. After a brief interval timing motor 10 then closes switch 10b which supplies current to the counter solenoid K2 to the key raising solenoid K5, through the switch 12, and also to the control relay K3 through switch 4a. The counter solenoid K2 actuates a conventional mechanical counter 2 which indicates the ordinal number of light values encoded on the control card so that the order of encoded values may be correlated with the order of the corresponding motion picture scenes. Relay K3 is of the latching or impulse type which responds to a current change to transfer its contacts 3a—3c between two positions in either of the directions indicated by the double-headed arrow. Switch 3a in the position illustrated supplies current to an indicating lamp V1; and in the position not shown supplies current to indicating lamp V2 and the column-selecting relay K6, causing switches 6 to transfer from contact 6a to contacts 6b, thus selecting one of the two sets of punch solenoids K9. At the same time that relay K6 is energized through switch 3a, switch 3c energizes solenoid K7 of the escapement mechanism. Whereas the column-selecting switches 6 transfer their contacts with every closing of the starting switch 15 the escapement mechanism 7 is actuated every other time that switch 15 is closed. Thus the coded groups will be punched in a succession which progresses back and forth across the control card as the card is fed past the punch mechanism 9.

Returning to timing motor 10, the switch 10c is opened after an interval of approximately one second from the time switch 10a is closed, de-energizing relay K1 and the timing device 10.

The timing device is designed to stop in starting position so that the next time the device is energized the switches 10a—10c are ready to be transferred in the desired order.

The key release switch 12 is provided so that if an incorrect key 11 has been accidentally punched, the key release solenoid K5 may be separately actuated to raise the incorrect key. When the card has been punched with the desired number of code groups it may be fed from under the punch pins by operation of the ejecting switch 14. Switch 14 energizes relay K4 causing it to transfer the switches 4a and 4b in the direction indicated by the arrow. Switch 4b energizes the card ejecting solenoid K8. Switch 4a is connected with one of the contacts of switch 3b such that if the control or sequencing relay K3 should be in the position not shown in Fig. 7 current will be applied through switch 3b and switch 4a to the relay K3, thereby momentarily energizing K3 and causing it to transfer its switches to the position shown in Fig. 7, in which position switch 3b will no longer supply current to relay K3. Thus when a new card is inserted the control or sequencing relay K3 will have been restored to a position such that the first code group of a series will be punched in a definite column of the card. If at any time during the punching operation it is not desirable to punch code groups in certain spaces on the card, the card may be advanced beyond those spaces by operation of manual spacing switch 13 which energizes the escapement solenoid K7.

Although the present disclosure illustrates a specific embodiment of the invention it should be understood that the invention includes all the modifications and equivalents which fall within the scope of the appended claims.

I claim:

1. In the art of marking a control record with a series of signal groups, each group including one or more signals disposed in a space extending transversely of the record, and the series extending generally lengthwise of the record, apparatus comprising stepping means for advancing the record to successive positions along a predetermined path, adjacent said path two sets of recording devices for marking signals in a transverse space, each set being disposed to mark a signal group in a portion of each transverse space offset transversely from a portion in the same transverse space occupied by another signal group, selectors for choosing certain devices of either set for operation, switching means for selectively interconnecting said selectors with either of said sets of devices so that each set is actuated at a different time, sequencing means for operating the stepping means intermittently and the switching means concomitantly therewith, a timing device operable from a starting condition successively to transfer the contacts of three timing switches, the first of said timing switches acting on transfer to supply current to said circuits, the second timing switch acting to actuate the control switch, and the third timing switch acting to restore the timing device to starting condition, and a starting switch for causing the timing device to operate, whereby the switching means and the stepping means are automatically actuated at a different time than the recording devices by the operation of a single starting switch, and the record may be marked with a succession of code groups which progresses transversely of said spaces and concomitantly from space to space.

2. In the art of marking a control record with a series of signal groups, each group including one or more signals disposed in a space extending transversely of the record, and the series extending generally lengthwise of the record, apparatus comprising stepping means for advancing the record to successive positions along a predetermined path, adjacent said path two sets of recording devices selectively actuatable to mark signals in a transverse space, each set being disposed to mark a signal group in a portion of each transverse space offset transversely from a portion in the same transverse space occupied by the other signal group, coding circuits for actuating selected devices of a set, a switching relay for selectively interconnecting said circuits with either of said sets of devices, said relay having switches transferrable between a starting position in which a certain set of recording devices is selected for actuation and an alternate position in which the other set is selected, a latching relay having a first position in which the switching relay is controlled to select said certain set of devices and a second position, a main circuit for energizing the latching relay, and an auxiliary circuit for restoring the latching relay to start position including a switch of the latching relay closed when the relay is in said second position, and a switch for closing said auxiliary circuit, whereby each transverse space of the record may be marked with a plurality of signal groups in a series which begins in a certain portion of a transverse space.

3. In the art of marking a control record with a series of signal groups, each group including one or more signals disposed in a space extending transversely of the record, and the series extending generally lengthwise of the record, apparatus comprising stepping means for advancing the record to successive positions along a predetermined path, adjacent said path two sets of recording devices for marking signals in a transverse space, each set being disposed to mark a signal group offset transversely from another signal group in the same transverse space, selectors for choosing certain devices of either set for operation, switching means for rendering either of the sets potentially operative, sequencing means for operating the stepping means intermittently and the switching means concomitantly therewith, a timer for successively actuating the sequencing means and the chosen recording devices, and a controller for initiating operation of the timer, whereby the stepping means and switching means may be operated at a different time than the recording devices by the operation of a single controller.

4. In the art of marking a control record with a series of signal groups, each group including one or more signals disposed in a space extending transversely of the record, and the series extending generally lengthwise of the record, apparatus comprising electromagnetic stepping means for advancing the record to successive positions along a predetermined path, adjacent said path two sets of recording solenoids for marking signals in a transverse space, each set being disposed to mark a signal group offset transversely from another signal group in the same transverse space, coding circuits for choosing certain devices of either set for operation, relay means for selecting either of the sets for operation so that each set is actuated at a different time, latching relay means having a position for operating the stepping means intermittently and another position for the switching means concomitantly therewith, an electric timer switch for successively actuating the latching relay and chosen marking device, and a control switch means for initiating operation of the timer, whereby the stepping means and switching relay means may be operated at a different time than the recording solenoids by the operation of a single control switch.

CHARLES D. BENNES.

REFERENCES CITED

The following references are of record in the file of this patent:

UNITED STATES PATENTS

| Number | Name | Date |
|---|---|---|
| 612,640 | Cochran | Oct. 18, 1898 |
| 940,377 | Ackerman | Nov. 16, 1909 |
| 1,832,118 | Hershey | Nov. 17, 1931 |
| 1,962,607 | Maul | June 12, 1934 |
| 2,237,130 | Bryce | Apr. 1, 1941 |
| 2,355,389 | Mills et al. | Aug. 8, 1944 |

FOREIGN PATENTS

| Number | Country | Date |
|---|---|---|
| 499,900 | Great Britain | Jan. 31, 1939 |